United States Patent [19]
Bates

[11] 3,894,165
[45] July 8, 1975

[54] COATED FLEXIBLE RETICULATE STRUCTURES AND METHOD FOR THE PREPARATION THEREOF

[75] Inventor: Lester W. Bates, Newark, Del.

[73] Assignee: G. S. Staunton & Co., Inc., Royal Oak, Mich.

[22] Filed: May 23, 1973

[21] Appl. No.: 362,905

[52] U.S. Cl. .............................................. 427/244
[51] Int. Cl. ............................................... B44d 1/44
[58] Field of Search............ 117/65.2, 98, 138.8 D, 117/161 KP, 161 ZA

[56] References Cited
UNITED STATES PATENTS

| | | | |
|---|---|---|---|
| 3,175,025 | 3/1965 | Geen et al. | 264/80 |
| 3,503,822 | 3/1970 | Turkewitsch | 117/98 |
| 3,520,764 | 7/1970 | Hoch | 117/65.2 |
| 3,546,001 | 12/1970 | Giannone | 117/65.2 |
| 3,645,775 | 2/1972 | Schulze | 117/161 KP |

Primary Examiner—William D. Martin
Assistant Examiner—Janyce A. Bell
Attorney, Agent, or Firm—Miller, Morriss, Pappas & McLeod

[57] ABSTRACT

A method for coating a flexible reticulate open structure with a normally viscous liquid curable isocyanate derived polymer so as not to block the openings in the structure is described. In particular a small amount of a polysiloxane oil of the general formula

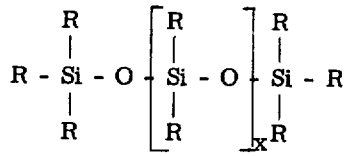

is employed with the liquid isocyanate derived polymer so as to modify the surface tension of the liquid for providing a thin coating on the surfaces of the structure. Novel products are prepared from a coating of diphenyl methane diisocyanate and a polyol having a hydroxyl number between about 100 and 1,000. The products are particularly useful for filtering purposes where the loading by the material to be filtered would deform a flexible structure, such as can happen with flexible polyurethane or fiber glass reticulate structures used by the prior art.

6 Claims, 2 Drawing Figures

COATED FLEXIBLE RETICULATE STRUCTURES AND METHOD FOR THE PREPARATION THEREOF

DESCRIPTION OF THE PRIOR ART

The prior art has described polyisocyanate rigidified flexible products. In particular, U.S. Pat. No. 3,260,618 describes rigidified polyurethane foam products wherein polyisocyanates, including those generally useful for preparing foams, are impregnated or absorbed into the strands of flexible polyurethane foams so that it can react with active hydrogen containing foam ingredients so as to stiffen or rigidify the flexible foam. In some instances, the products were subsequently surface coated to improve their resistance to chemical action. Because the core of the strands of the flexible foam are rigidified, the products tend to be brittle; however, the prior art used this method because the organic polyisocyanates are non-viscous fluids which easily penetrate either reticulated foam or non-reticulated foam without cell membranes removed.

The prior art has described coating the strands of flexible polyurethane foams with curable liquid elastomeric polyurethane polymer compositions, but the compositions had to be a relatively non-viscous in liquid form with Brookfield viscosity readings of less than about 2,000 centipoises at 30°C. This is shown in U.S. Pat. No. 2,955,056 and as indicated therein, the cells were sometimes closed by the elastomer because of lack of control over the uniformity of coating of the strands. U.S. Pat. No. 3,193,426 shows open cell or reticulated polyurethane foams which are completely impregnated with relatively viscous thermosetting polymers so that there are no openings.

The problem for which the prior art has not achieved a solution and to which the present invention is directed as an object is to provide a method for coating the surfaces of a flexible reticulate polyisocyanate derived structure, particularly a reticulated polyurethane foam, with a uniform thin coating of a liquid curable polyisocyanate derived polymer which is normally viscous and tends to clog the openings of the flexible reticulate structure. It is also an object of the present invention to provide novel rigidified flexible reticulated foam products. These and other objects will become increasingly apparent by reference to the following description and to the drawing.

IN THE DRAWING

DESCRIPTION OF THE INVENTION

Figure 1:
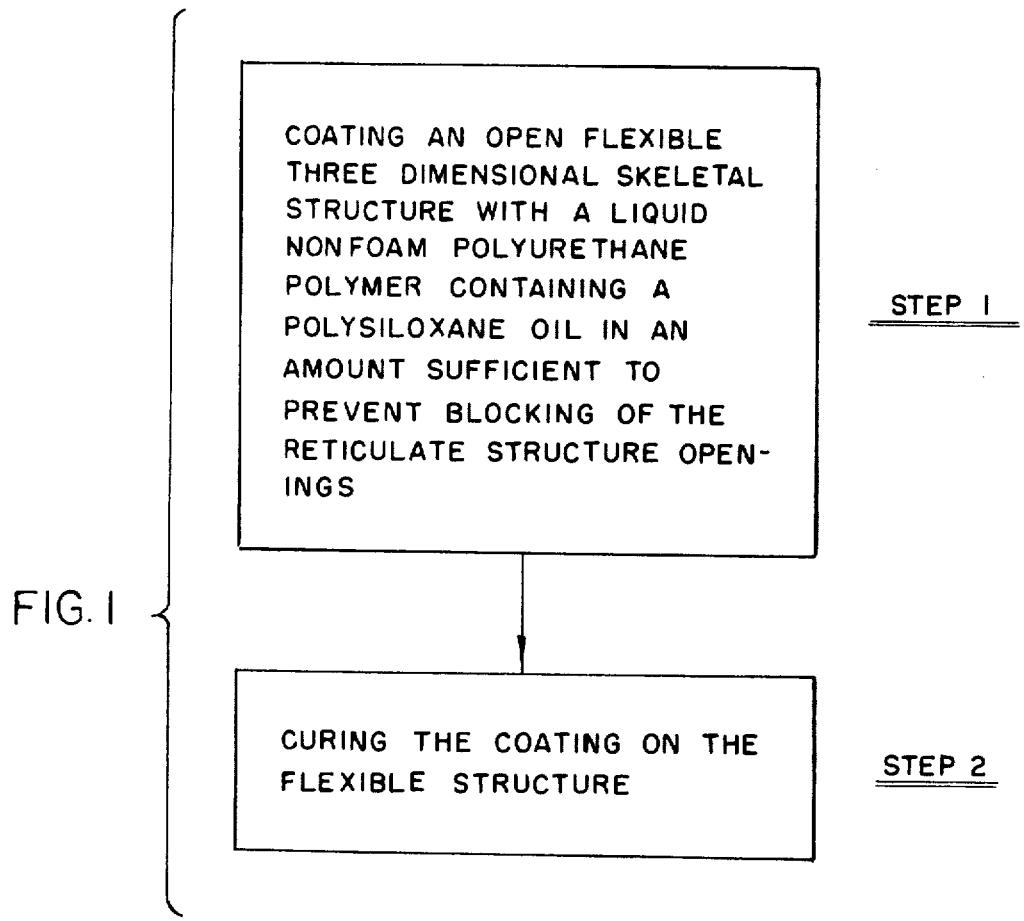
FIG. 1 is a schematic view of the method of the present invention wherein the coating step is particularly described, including the use of a polysiloxane oil.

The method of the present invention for forming a reticulate structure comprises coating a core of a flexible three dimensional skeletal structure with a liquid non-foam polyisocyanate derived polymer which cures to a thin coating and containing in admixture therewith a small amount of a polysiloxane oil sufficient to thinly coat the strands with the non-foam liquid rigid polyurethane polymer without blocking the openings between the strands; and curing the polymer. The rigidified product of the present invention comprises: a core of a flexible three dimensional reticulate structure of strands; and a non-foam substantially continuous thin coating on the strands of a rigid polymer derived from diphenyl methane diisocyanate and a polyol having a hydroxyl number between about 100 and 1,000, the coating and core weight being between about 1.5 and 3.5 times the weight of the uncoated core.

The preferred flexible reticulate structures are flexible reticulated polyurethane foams. A particularly preferred reticulated product is described in U.S. Pat. No. 3,175,025 and is produced by thermal reticulation. The reticulated foams have interconnected strands. Other flexible structures are for instance fiber glass as well as various organic fibers in te form of a mat of strands. Many of these materials are well known in the filtration art where there are problems of down stream deformation due to loading by the material being filtered.

For some filtration applications, the normal flexible reticulated polyurethane foams (or mats of strands) are too flexible for their intended use. One solution to this problem would, of course, involve the preparation of a reticulated rigid type cellular material. Another approach would be to treat in some manner the available flexible reticulated foam so as to stiffen these materials with a rigidizing coating. The latter approach is the subject of the preferred products of the present invention.

The preferred rigid polyurethane coatings of the present invention provide a means for rigidifying flexible open structures. Some of the important properties of a rigid coating on a flexible foam are described as follows: (a) The coating must be hard and tough, as only a thin film thickness would be deposited upon the rib structure of the reticulated foam. Thus, in thin films the polymer should have a high flexural modulus, so as to adequately stiffen the flexible foam but yet not be brittle. (b) The application of about 25–50 grams of polymer per square foot, upon 1.27 cm thick reticulated foam was estimated. (c) It is required that no volatile solvents be used because they represent an in-plant hazard. This eliminates all types of fast dry lacquer coatings which are of sufficiently low viscosity to facilitate spray application. (d) In process cure time should be fast (e.g., 5 minutes maximum) so that reasonable line speeds can be achieved on a roll coater. (e) There must be no bridging of the reticulated cell structure which would impede the passage of air or other fluids through the coated product. (f) The coating should preferably be flame retardant. (g) Preferably the coating should be pigmented so as to match the color of the reticulated flexible foam.

Various polymeric materials were considered for providing a rigid coating on the flexible reticulate structures such as hot melt thermoplastics, thermoset materials, latices, blocked polycondensation or polyaddition polymers, etc. Some were tried and these failed in meeting the above criteria in some manner, mostly with regard to excessive brittleness. The polyurethanes were the only ones that appeared to have promise for this application. In developing a polyurethane for this application, the primary consideration is the selection of a polyol capable of providing a hard, tough, and rigid backbone for the urethane polymer. A slower reacting polyisocyanate-polyol mixture was preferred which allows for a delay in introduction into the reticulate structure and does not tend to entrap bubbles within the plastic mix. This delay facilitates roll coating. Also, bubbles within the cast film or coating would weaken the product.

The preferred rigid coatings of the present invention are made with a liquid polyether polyol as one ingredient having a hydroxyl number between about 100 and 1,000, and therefore equivalent weight of hydroxyl groups of between about 561 and 56 based upon dividing 56,100 by the hydroxyl number. Such polyether polyols produce rigid tough polyurethane polymers, sometimes characterized as semi-rigid polymers. They are preferably used without a volatile solvent and have a viscosity between about 100 and 25,000 centistokes at 25°C and a density between about 0.9 and 1.5 grams per cc at 25°C. The higher end of the density range embraces halogenated polyols to impart flame retardant properties to the polymer.

Other polyisocyanate reactive compounds, such as polyester polyols and polyesteramines, containing active hydrogens can be used in the method of the present invention providing they form a useful polyisocyanate derived polymer coating, preferably a semi-rigid resin as is well known to those skilled in the art.

The polyisocyanates used as the second principal ingredient to prepare the polyisocyanate derived polymer for the coating is preferably diphenyl methane diisocyanate (MDI). When MDI is used with the preferred polyether polyols, the cured coatings produced are rigid without being brittle and tough without being rubbery or elastic. As will be shown more fully hereinafter, such products are sufficiently thermoplastic to be post formed. Other polyisocyanates which can be used in the method are polymethylene polyphenyl isocyanate (PAPI); toluene diisocyanate (TDI) and the like although these are not preferred for preparing the rigid coatings of the present invention since the coated products are brittle. Other diphenyllower alkylene diisocyanates similar to MDI would be preferred. Where brittleness is not important, then polymers derived from polyisocyanates other than MDI can be used.

Elastomeric coatings on the flexible structure can also be prepared by the method of the present invention using polyisocyanates and polyols with lower hydroxyl numbers or available active hydrogen groups. The use of the silicone oils provides a means for coating with these polymers as well.

The important step in the method of the present invention for producing thin coatings of the liquid isocyanate derived resins is the use of the silicone oils as the final ingredient. These oils modify the surface tension for coating purposes of the liquid polyisocyanate derived polymer so that they can be applied as thin coatings, but do not otherwise deteriorate the quality of the product.

The silicone oils useful in the present invention are lower alkyl polysiloxane oils of the formula:

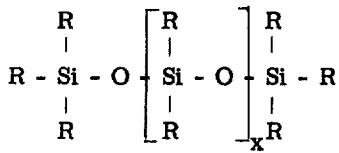

wherein R is a lower alkyl group, particularly methyl or ethyl, and ranging in viscosity from about 7 to 100,000 centistokes at 25°C. These are readily available from Union Carbide, Dow Corning, General Electric for instance. The preferred silicone oils have a viscosity between about 0.5 and 100,000 centistokes at 25°C. Such silicone oils have been used as coatings to reduce internal tack and bondability in foams as shown by U.S. Pat. No. 2,992,940 in amounts between one to two percent (1-2%) by weight of the foam.

The present invention contemplates the use of between about 0.05 and 2.5 percent silicone oil by weight of the reticulate structure or 0.1 to 10 parts by weight per 100 parts by weight polyol. The coated strands of product of the present invention are thermally bondable as will be described more fully hereinafter and thus are quite different than those described by the prior art. In the present application the polysiloxane oils minimize the tendency of the isocyanate derived polymer to bridge and coat over the openings between the strands.

Figure 2:
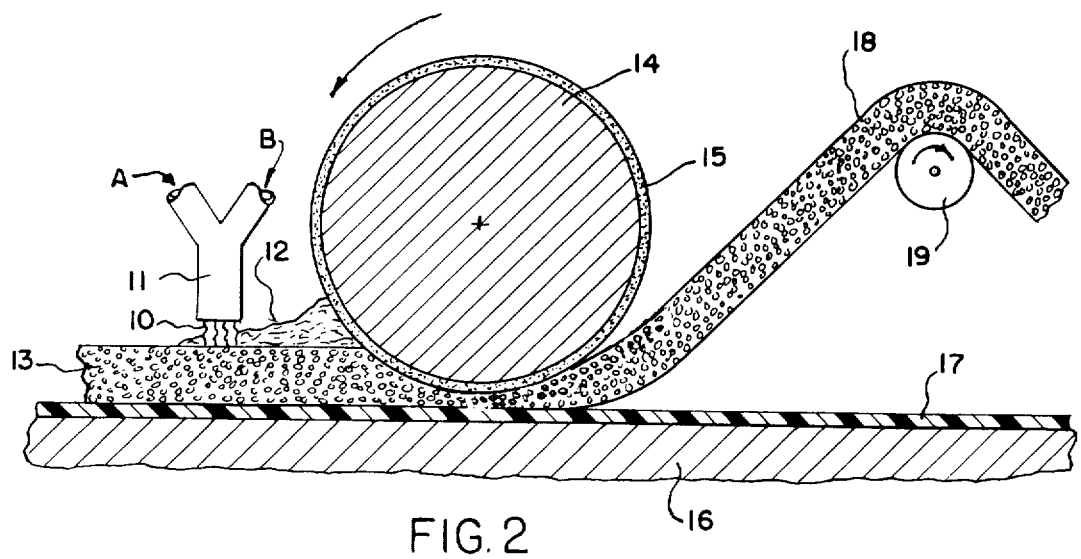
FIG. 2 is a schematic front view illustrating the preferred means for the application of a coating of a curable liquid polyisocyanate polymer to the surfaces of a flexible reticulated polyurethane foam using a foam compressing roller to apply the coating.

As is well known to those skilled in the art, the reactants polyisocyanate and active hydrogen containing compounds are mixed under anhydrous conditions with the polysiloxane oil and then immediately coated on the strands of the flexible structure. The reactants and the additives are generally characterized separately as components A and B as shown in FIG. 2. The liquid polymer mixture 10 is applied as a mass 12 through mixer tube 11 to the upper surface of the foam 13. The tube is preferably 7 to 10 cm from the outermost portion of the roller 14. The foam and liquid mass are then compressed between a roller 14, preferably provided with adjustable loading and coated with a friction surface 15 to aid in driving the foam 13, and a fixed surface 16 coated with a slide plate 17 such as polyfluoroethylene polymer. It is preferred to provide a close spacing between the roller 14 and slide plate 17 with the roller adjusted to compress the foam to about ten percent (10%) of its original thickness. This step calenders the liquid polyisocyanate derived polymer unto the strands. The coated structure 18 is then carried over a second roller 19 and to heating ovens (not shown) for curing usually at a temperature between about 65°C to about 200°C preferably about 115°C for about 5 5 minutes for the preferred resins discussed above. Curing and calendering methods are well known to those skilled in the art as generally evidenced by U.S. Pat. No. 3,172,072.

An effective flame retardant agent is preferably added, such as a halogenated phosphate, so as to give the coated product self-extinguishing characteristics. A potent organo tin type or other catalyst is preferably used at levels which will accommodate the process line speed. The color coordination is achieved by the use of suitable pigment. The polyol can be used as a medium for dispersing the pigment and thus used to prepare a paste masterbatch.

The following Example I shows a preferred formulation of the liquid polyurethane polymer as well as the method and products of the present invention.

EXAMPLE I

|  | Parts By Weight |
|---|---|
| Part A | |
| 900 | Liquid MDI 90 |
|  | Part B |
| 937 | Polyether polyol 93.7 |
|  | (1) |

EXAMPLE I-Continued

| | | Parts By Weight |
|---|---|---|
| 700 | tris-2,3-dibromo-propyl-phosphate | 70 |
| 0.2 | Dibutyl tin dilaurate | 0.02 |
| 18.8 | Silicone oil (2) | 1.88 |
| 66 | Black Paste (3) (see below) | 6.6 |
| 1722 | TOTAL | 172.2 |

Mix Ratio A/B= 90/172.2 = 1/1.92
Cure Time-In Process 5 min. (approx.)
90% Cure 2 hours ) 
 ) At room
Full Cure Overnight) Temperature (1) Voranol$_{T.M.}$ RH 360 (Dow Chemical Co.) polyether polyol prepared from propylene oxide and a polyhydroxy initiator having a hydroxyl number of about 334 to 354 and a viscosity at 25°C of about 2,800 centistokes, equivalent weight 158.
(2) Polysiloxane oil with a viscosity at 25°C of 350 centistokes.
(3) Black Pigment Paste —Masterbatch

| Voranol RH-360 | 622 |
|---|---|
| Elftex 8 | 31 |
| Phalo Blue 55-3300 | 7 |
| Total | 660 |

EXAMPLE I

| | | Parts By Weight |
|---|---|---|
| Part A | | |
| 900 | Liquid MDI | 90 |
| | Part B | |
| 937 | Polyether polyol (1) | 93.7 |
| 700 | tris-2,3-dibromo-propyl-phosphate | 70 |
| 0.2 | Dibutyl tin dilaurate | 0.02 |
| 18.8 | Silicone oil (2) | 1.88 |
| 66 | Black Paste (3) (see below) | 6.6 |
| 1722 | TOTAL | 172.2 |

Mix Ratio A/B= 90/172.2 = 1/1.92
Cure Time-In Process 5 min. (approx.)
90% Cure 2 hours )
 ) At room
Full Cure Overnight) Temperature (1) Voranol$_{T.M.}$ RH 360 (Dow Chemical Co.) polyether polyol prepared from propylene oxide and a polyhydroxy initiator having a hydroxyl number of about 334 to 354 and a viscosity at 25°C of about 2,800 centistokes, equivalent weight 158.
(2) Polysiloxane oil with a viscosity at 25°C of 350 centistokes.
(3) Black Pigment Paste —Masterbatch

| Voranol RH-360 | 622 |
|---|---|
| Elftex 8 | 31 |
| Phalo Blue 55-3300 | 7 |
| Total | 660 |

The formulation is coated on flexible polyester polyurethane foam of varying cell sizes using the method shown in FIG. 2 and described above. The curing oven was set at 115°C. The results of such coating are shown in Table I. Table I represents the minimum deposition of coating we were able to apply to 11.4 centimeter diameter die cut circles of reticulated foam, supplied to us in sheets, at the indicated thickness and pore size. The numbers in the table represent the weight in grams divided by 20 of both uncoated foam. Original foam density was approximately constant at about 0.027 gram per cubic centimeter regardless of pore size. However, weight pick up of the coating increased as the average pore size was reduced, since this is a function of the increased surface area.

TABLE I

COATING PICK UP AND RELATIONSHIP TO SHEET THICKNESS AND PORE SIZE

| Pore Size[1] | | Reticulate Structure Thickness | | | | |
|---|---|---|---|---|---|---|
| | | 1/4" | 3/8" | 7/16" | 1/2" | 1" |
| 10–15 | (uncoated) | 35 | 65 | 70 | 75 | 145 |
| | (coated) | 65 | 125 | 150 | 155 | 275 |
| 15–20 | (uncoated) | 35 | 65 | | 75 | |
| | (coated) | 100 | 135 | | 180 | |
| 30–40 | (uncoated) | 35 | 65 | | 75 | |
| | (coated) | 110 | 150 | | 220 | |

[1] Pores per linear inch.

It is commonly known that polyurethanes, as a class of polymeric materials, range in characteristics from those which could be considered true thermoset plastics, (e.g., many of the rigid foams), to those which are considered thermoplastic materials, (e.g., injection grade polyurethane molding compounds).

The particular molecular structure of any given polyurethane materials is the governing factor which determines the thermoplasticity of the material. Linear chain structures produce more thermoplastic polymers and highly branched and cross linked structures are likely to produce thermoset type polymers. In general, if the molecular weight per cross link (Mc) is low, the material is likely to be thermoset, and if the Mc is high, the material will more likely be thermoplastic. Obviously there is an infinite number of intermediate possibilities whereby the polymers so formed can be partially thermoset and partially thermoplastic. Semi-rigid polyurethanes actually belong to this intermediate group, which have some of the characteristics of thermoset materials and some of the characteristics of thermoplastic materials.

The products of Example I were thermally post formed at elevated temperatures. For instance, the product was compressed to compact the strands at about 176°C so as to permanently reduce the thickness from 0.550°inches to 0.045 inches. This is possible because the thermoplastic characteristics of the applied polyurethane coating at this temperature is lower than the thermoplastic temperature of flexible polyurethane. Even though the product was highly densified by this means, it still provides a high degree to porosity. This characteristic offers a means to shape end products made from the coated foam, so as to provide contours, densified edges, etc. on particular end products, such as for specially shaped filters. Numerous other possibilities will present themselves to those interested in utilizing the thermoplastic characteristics of this stiff and tough polyurethane coating. PAPI is one of the commonly available, low cost polyisocyanates used today. However, for our intended use as an isocyanate in a polyurethane plastic suitable for rigidizing it has at least two distinct shortcomings; namely: (1) A high viscosity (250 cps at 70°F), and (2) A functionality greater than two which results in excessive cross linking. As the molecular weight per cross link (Mc) is increased, the brittleness of the polyurethane molecular structure is reduced; however, none were found to be useful for purposes of the present invention.

Other polyisocyanates can be used in the method of the present invention; however the products were not preferred. TDI (80/20 Isomer) is inexpensive and has a functionality of two. It is also a very fluid substance but unfortunately it has a high volatility when subjected to curing temperatures of approximately 250°F. This high volatility creates two major problems in attempting to use TDI as an isocyanate for rigidizing. In the first place the TDI volatilizes simultaneously with the curing reaction with the polyol. This produces bubble voids in the rigidizing coating. These bubbles seriously weaken the coating and make it more prone to fracture when it is flexed. Secondly, the fume hazard in handling semi-cured sheets of rigidized foam is a serious manufacturing problem.

By comparison, MDI is a solid at ambient temperature and as such has a very low vapor pressure. It is a symmetrical molecule and as a result of this both isocyanate groups have equal reactivity. In this respect its cure reactions with polyols differ markedly from TDI. The latter has isocyanate groups, some of which are "ortho" and some of which are "para" to the methyl group on the benzene ring. Furthermore, MDI contains two benzene rings per molecule of the isocyanate. These additional benzene rings tend to stiffen the polyurethane molecular structure to which they are joined.

Liquid forms of MDI are known to the art (such as Isonate$_{T.M.}$ 143 L, Upjohn). It is of low viscosity and has a low vapor pressure and as such it has been found to be ideally suited for making polyurethane coating compositions suitable for rigidizing flexible urethane foams. There are no flammable solvents evolved and the volatile isocyanate vapors are kept to a minimum during processing. Furthermore, the preponderance of bulky benzene rings in the molecular structure of MDI greatly adds to the rigidity of the resulting coating. Hence, the mixture formed by reacting approximately equal chemical equivalents of the preferred polyether polyols and liquid MDI with appropriate levels of catalyst has been found to be most useful in preparing a rigidizing coating for flexible urethane foams which are the preferred products of the present invention.

I claim:

1. The method for forming a rigid reticulate structure which comprises:
   a. coating a core of a reticulate flexible three dimensional skeletal structure having openings between strands which form the structure with a liquid non-foam polyisocyanate derived polymer formed by mixing a polyisocyanate and a polyol having a hydroxyl number between 100 and 1,000 immediately prior to coating and which cures to a thin coating and containing in admixture therewith between about 0.1 and 10 parts by weight of polysiloxane oil per 100 parts by weight of the polyol so as to thinly coat the strands with polyurethane polymer witout blocking the openings between the strands; and
   curing the polyurethane polymer coating to a rigid condition.

2. The method of claim 1 wherein the coating is applied by compressing the skeletal structure with the liquid polyurethane polymer deposited on an exposed outer surface thereof between at least one roller and an opposing surface.

3. The method of claim 2 wherein the spacing between the roller and a spaced apart slide plate as the opposing surface is adjusted to compress the foam to about 10% of its original thickness.

4. The method of claim 1 wherein the core is a reticulated polyurethane foam of interconnected strands having between about 10 and 100 openings per linear inch.

5. The method of claim 1 wherein the coated strands are compressed to permanently interbond the strands.

6. The method of claim 1 wherein the polyisocyanate is diphenylmethane disocyanate and the polyol is a polyether polyol.

* * * * *

UNITED STATES PATENT OFFICE
CERTIFICATE OF CORRECTION

Patent No. 3,894,165　　　　　　　　Dated 1975 July 8

Inventor(s) Lester W. Bates

It is certified that error appears in the above-identified patent and that said Letters Patent are hereby corrected as shown below:

Column 2, line 16, "te" should be --the--.

Column 3, line 37, "diphenyllower" should be --diphenyl lower--.

Column 4, line 42, "5 5" should be --five (5)--.

Column 4, line 60 to column 5, line 58, Example 1 is repeated and should be

EXAMPLE I

|  | Parts by Weight | |
|---|---|---|
| Part A | | |
| Liquid MDI | 90 | 900 |
| Part B | | |
| Polyether polyol (1) | 93.7 | 937 |
| tris-2,3-dibromopropyl-phosphate | 70 | 700 |
| Dibutyl tin dilaurate | 0.02 | 0.2 |
| Silicone oil (2) | 1.88 | 18.8 |
| Black Paste (3) (see below) | 6.6 | 66 |
| TOTAL | 172.2 | 1722 |

UNITED STATES PATENT OFFICE
CERTIFICATE OF CORRECTION

Patent No. 3,894,165      Dated 1975 July 8

Inventor(s) Lester W. Bates

It is certified that error appears in the above-identified patent and that said Letters Patent are hereby corrected as shown below:

Mix Ratio A/B =      90/172.2 = 1/1.92

Cure Time-In Process      5 min. (approx.)

90% Cure      2 hours ) At room

Full Cure      Overnight) Temperature (1) Voranol$_{T.M.}$ RH 360 (Dow Chemical Co.) polyether polyol prepared from propylene oxide and a polyhydroxy initiator having a hydroxyl number of about 334 to 354 and a viscosity at 25°C of about 2,800 centistokes, equivalent weight 158.

(2) Polysiloxane oil with a viscosity at 25°C of 350 centistokes.

(3) Black Pigment Paste - Masterbatch

| | |
|---|---|
| Voranol RH-360 | 622 |
| Elftex 8 | 31 |
| Phalo Blue 55-3300 | 7 |
| Total | 660 |

UNITED STATES PATENT OFFICE
CERTIFICATE OF CORRECTION

Patent No. 3,894,165            Dated 1975 July 8

Inventor(s) Lester W. Bates

It is certified that error appears in the above-identified patent and that said Letters Patent are hereby corrected as shown below:

Column 6, line 27, "materials" should be --material--.

Column 6, line 46, "0.550° inches" should be --0.550"--.

Column 6, line 63, "70°F" should be --77°F--.

Column 7, line 28, after "Upjohn" delete the comma and insert therefor a period.

Column 8, line 16, after "with", insert --non-foam liquid--.

Column 8, line 17, "witout" should be --without--.

Column 8, line 18 insert "b." before --curing--.

*Signed and Sealed this*

*seventh* Day of *October 1975*

[SEAL]

*Attest:*

RUTH C. MASON  
*Attesting Officer*

C. MARSHALL DANN  
*Commissioner of Patents and Trademarks*